United States Patent
Poe

[15] 3,696,891
[45] Oct. 10, 1972

[54] ENERGY ABSORBING DEVICE

[72] Inventor: Lloyd Richard Poe, Beverly Hills, Calif.

[73] Assignee: The Hartwell Corporation, Los Angeles, Calif.

[22] Filed: Oct. 29, 1970

[21] Appl. No.: 85,001

[52] U.S. Cl. ................. 188/1 C, 74/492, 188/268
[51] Int. Cl. ............................................. F16f 7/12
[58] Field of Search ......... 74/492; 188/1 B, 1 C, 268; 293/70

[56] References Cited

UNITED STATES PATENTS

| 3,160,233 | 12/1964 | Norman et al. | 188/1 B |
| 3,053,526 | 11/1962 | Kendall | 188/268 X |
| 3,538,783 | 11/1970 | Butts | 188/1 C X |
| 3,538,785 | 11/1970 | Grancon | 188/1 C X |
| 3,583,530 | 6/1971 | De Venne | 188/1 B |

Primary Examiner—Duane A. Reger
Attorney—Lyon & Lyon

[57] ABSTRACT

An energy absorbing device which includes a deformable or elastomeric energy absorbing member, an indenting element, and means for effecting relative movement causing the indenting element to be pressed into the energy absorbing member; the energy absorbing member being restrained against translation movement but otherwise not bonded so that, on relative movement of the energy absorbing member indenting elements, the indenting element not only causes localized deformation of the energy absorbing member, but also subjecting the energy absorbing member to tension loads and compressing loads throughout substantial areas at opposite sides of the region of localized deformation so that energy absorbtion is distributed over a substantial region.

32 Claims, 28 Drawing Figures

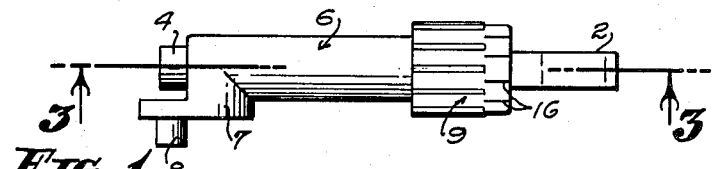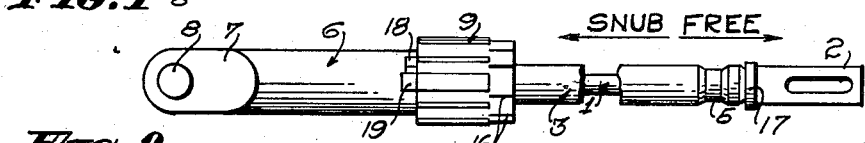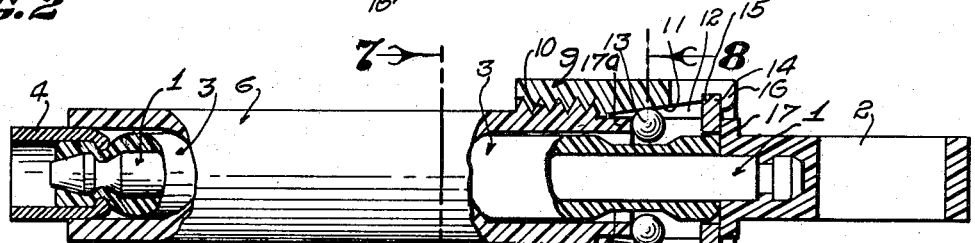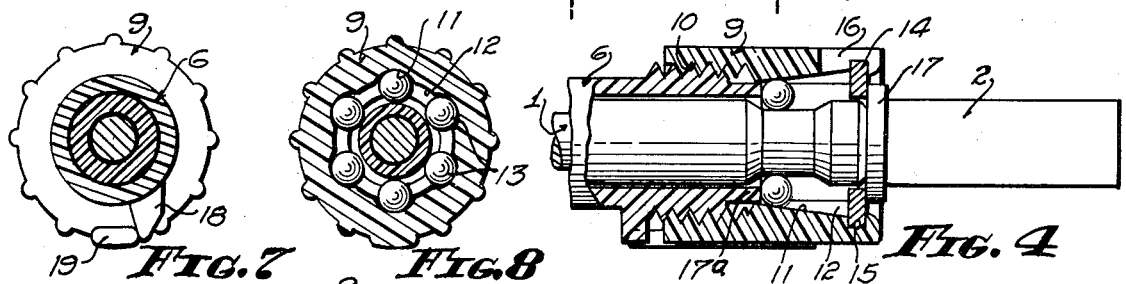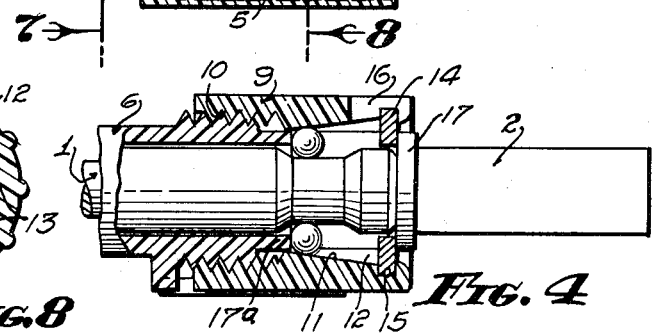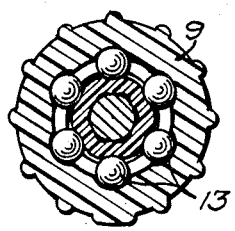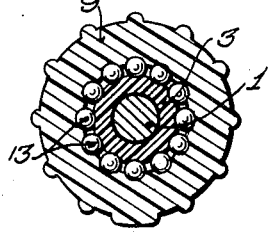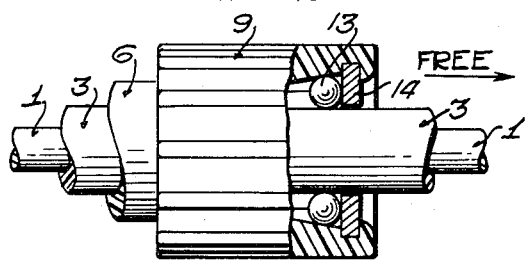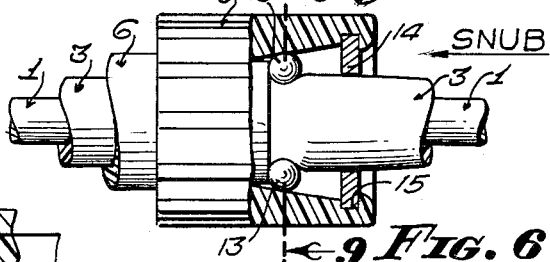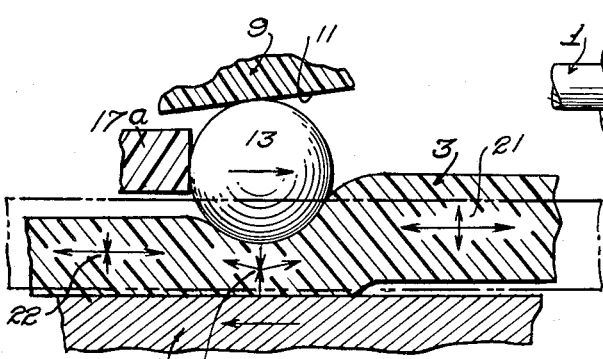
INVENTOR.
LLOYD RICHARD POE
BY
Lyon Lyon
ATTORNEYS

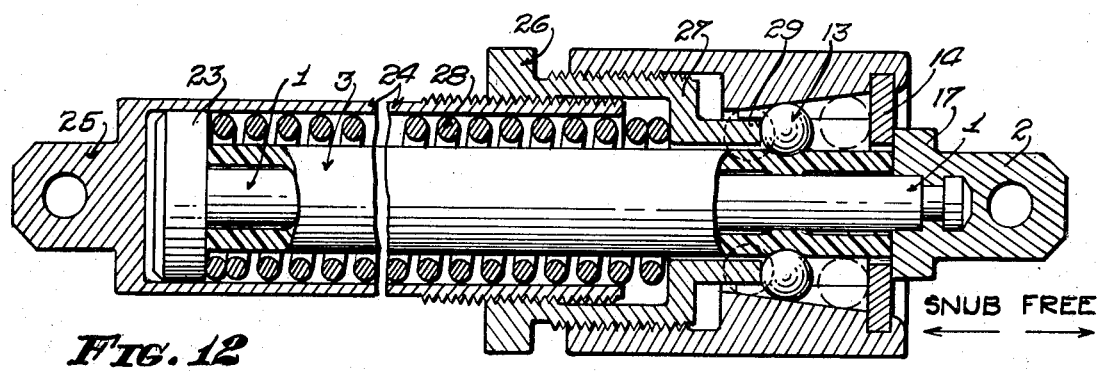
FIG. 12
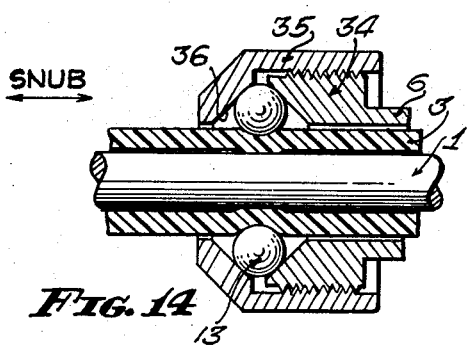
FIG. 14
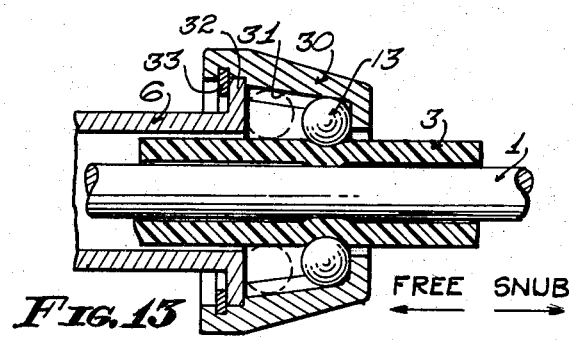
FIG. 13
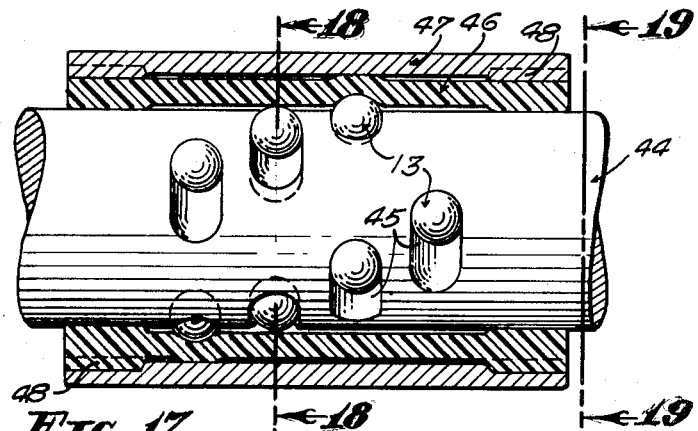
FIG. 17
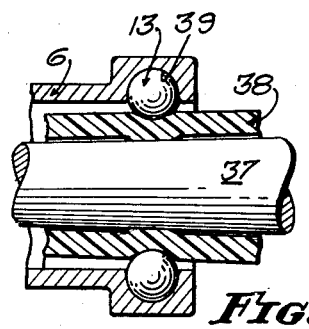
FIG. 15
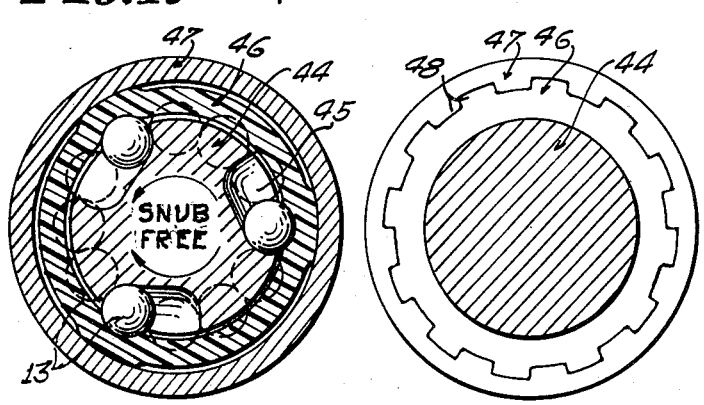
FIG. 18
FIG. 19
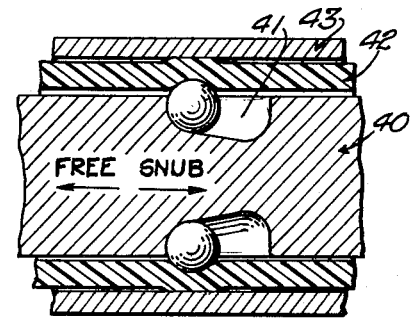
FIG. 16
INVENTOR.
LLOYD RICHARD POE
BY
Lyon+Lyon
ATTORNEYS

INVENTOR.
LLOYD RICHARD POE
BY
ATTORNEYS

ENERGY ABSORBING DEVICE

BACKGROUND OF THE INVENTION

Energy absorbing devices have many applications and thus vary substantially in construction as well as mode of operation. The principal type is known as a "dash pot" and involves a piston and cylinder utilizing a small orifice for transfer of fluid from one chamber to another when a load is applied; automobile shock absorbers and door checking devices are typical. The fluid is a liquid in the case of hydraulic dampers, or air in the case of pneumatic dampers. Attempts have been made to utilize an elastically deformable plastic material bonded to an underlying surface and engaged by rollers or ribs which press into the surface on a relative movement. Typical of this type of energy absorbing devices are the embodiments shown in U.S. Pat. No. 3,232,597 and U.S. Pat No. 3,160,233. Due to the fact that the plastic material is bonded to an underlying rigid surface, the region of the material that can be distorted as the roller, ball or other indenting moves along the material is conferred to the immediate vicinity of the indenting member. This subjects the material to severe stress concentration which may materially reduce the cyclic life of the energy absorbing device. If the stress concentration is reduce, the overall size of the energy absorbing device must be increased, for the area of contact must be increased while the depth of indention must be decreased.

SUMMARY OF THE INVENTION

The present invention is directed to an energy absorbing device capable of wide application and capable of withstanding an extremely large number of operation cycles; the invention being summarized in the following objects:

First, to provide an energy absorbing device which utilizes a resiliently deformable member so arranged as to undergo localized resilient deformation, but also capable of being resiliently stretched and compressed laterally of the region of localized deflection with the result that even in the region of localized deformation stress concentrations are minimized and the life of the deformable member is materially increased.

Second, to provide an energy absorbing device wherein the hysteresis loss is maximized and the friction loss is minimized so that the advantages of a "dash pot" of the hydraulic or pneumatic damper is attained in a structure of greatly reduced cost and weight.

Third, to provide an energy absorbing device which, similar to a hydraulic or pneumatic damper, absorbs surge or shock forces during its operation, to assure smooth operation of the mechanism controlled by the enerby absorbing device.

Fourth, to provide an energy absorbing device which may be designed to meet a wide variety of special conditions; that is, the device may be arranged to provide:

a. a damping or snubbing movement in one direction and a free or different snubbing movement in the opposite direction;

b. a damping or snubbing movement which varies according to a predetermined pattern such as, but not limited to, progressively increasing or decreasing its damping or snubbing effect;

c. for ready adjustment of the damping or snubbing force;

d. predictably uniform damping or snubbing action.

DESCRIPTION OF THE DRAWINGS

FIG. 1 is a side view of one embodiment of the energy absorbing device, utilizing an energy absorbing sleeve capable of longitudinal movement and a set or ring of indenting balls, the device being shown in its retracted position.

FIG. 2 is an elevational view thereof, taken at right angles to FIG. 1, and showing the sleeve in its extended position.

FIG. 3 is an enlarged partial elevational, partial sectional view, taken through 3—3 of FIG. 1, showing the energy absorption sleeve in its retracted and free position, and the indenting balls adjusted for minimum engagement with the sleeve.

FIG. 4 is a fragmentary sectional view, corresponding to FIG. 3, showing the indenting balls adjusted for maximum engagement with the energy absorbing sleeve.

FIG. 5 is a fragmentary view, partially in section, showing the relation of the indenting balls and energy absorbing sleeve when the sleeve is being extended.

FIG. 6 is a view similar to FIG. 5, showing the relationship of the indenting balls and energy absorbing sleeve as the sleeve is being retracted and performing its energy absorbing function.

FIG. 7 is a transverse sectional view, taken through 7—7 of FIG. 3.

FIG. 8 is a sectional view, taken through 8—8 of FIG. 3. FIG. 9 is a sectional view, taken through 9—9 of FIG. 6.

FIG. 10 is a sectional view, corresponding to FIG. 9, but showing the effect if a larger number of indenting balls is used.

FIG. 11 is an enlarged substantially diagrammatical sectional view, corresponding to the condition shown in FIG. 6 and illustrating the inter-reaction of the indenting balls and energy absorbing sleeve.

FIG. 12 is a longitudinal sectional view, illustrating another embodiment of the energy absorbing device, wherein spring force is utilized to effect movement in a direction to cause the energy absorbing sleeve to perform its function.

FIG. 13 is a fragmentary sectional view, showing a further embodiment of the invention, wherein the snubbing or energy absorbing movement of the sleeve takes place during the extension movement of the sleeve.

FIG. 14 is a fragmentary sectional view of a further embodiment, wherein the energy absorbing sleeve performs its snubbing or energy absorbing function during movement in either direction.

FIG. 15 is a fragmentary sectional view, showing a further embodiment wherein the amount of energy absorption changes during movement of the sleeve.

FIG. 16 is a still further embodiment, wherein the indenting balls are arranged with in the energy absorbing sleeve.

FIG. 17 is a fragmentary sectional view of a still further embodiment of the invention, in which the energy absorbing sleeve and indenting balls are arranged for relative rotational movement as distinguished from longitudinal movement.

FIG. 18 is a transverse sectional view, taken through 18—18 of FIG. 17.

FIG. 19 is a transverse sectional view, taken through 19—19 of FIG. 17.

Figure 20:
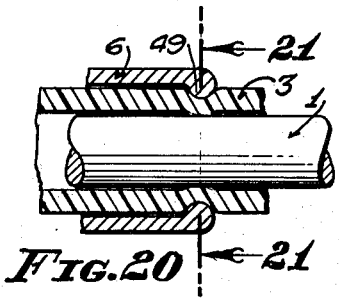
FIG. 20 is a fragmentary sectional view showing a further modification in which the indenting means are integral with the housing.

Reference is first directed to FIGS. 1 through 10. The embodiment of the energy absorbing device here illustrated is adapted to be extended and retracted, the energy absorbing function occurs during retraction and the co-acting parts are in a relative free condition when the device is retracted.

This embodiment of the device includes a mandrel 1, having an attachment fitting 2 at one end, and is covered by an energy absorbing sleeve 3, extending from the attachment fitting 2 to the opposite end of the mandrel where it is gripped by a clamp collar 4. Adjacent the fitting, the sleeve may be provided with a clearance groove 5.

For most applications, the sleeve is formed of plastic material, having elastomeric qualities. The strength of the sleeve, its resistance to deformation and its recovery rate after deformation depends upon the intended use. For example, but not by way of limitation, the sleeve may be formed polyvinylchloride, polyurethane, silicon rubbers, natural rubbers, Nylon, and many combinations thereof to meet the wide range of applications which not only require a wide range of elastomeric properties but also require a range of low friction properties.

A tubular housing 6 is fitted loosely on the sleeve, and in the construction illustrated, is provided with an offset end 7, having a pivot pin 8. The opposite end of the housing which terminates adjacent the fitting 2 receives a cap 9. A screwthreaded connection 10 is provided between the cap and housing so that the cap may be adjusted longitudinally with respect to the housing.

The cap 9 projects beyond the housing 6 and is provided with a conical wall 11, having longitudinally extending spacer ribs 12. A ring or set of ball detents, pressing or indenting elements 13 is received between the ribs for engagement with the conical wall and with the confronting energy absorbing sleeve 3. The outer extremity of the cap 9 is provided with a retaining ring 14, which is received in a channel 15. In order that the ring may be inserted, the end portion of the cap 9 may be provided with longitudinal slits 16. The attachment fitting 2 is provided with a stop shoulder 17, which engages the ring 14 when the energy absorbing device is in its retracted position.

In order to limit axial adjustment of the cap relative to the housing, the housing is provided with a small radiating lug 18 which engages an axially extending finger 19 formed on the cap. When the cap 9 is initially screw-threaded onto the housing 6, the finger 19 is forced past the lug 18.

Operation of the energy absorbing device shown in FIGS. 1 through 10 as follows:

The interaction of the indenting balls and the energy absorbing sleeve is best illustrated in FIG. 11. Plastic material unless, it is a foamed product containing gas cells is essentially incompressible, that is its volume does not change so that compression in one direction causes expansion in another direction. During the energy absorbing movement of the device, each indenting ball bears against the extremity of the housing 6 and the conical wall 11 and is pressed radially inward to establish a radially compressed and laterally tensioned region 20. As the indenting balls move relative to the sleeve, the portion of the sleeve ahead of the balls forms a longtitudinally compressed and traversely tensioned region 21, and the portion of the sleeve behind the balls forms a longitudinally tensioned and traversely compressed region 22. Also, during movement of the indenting ball, some frictional sliding movement between the sleeve and the underlying mandrel probably occurs; however, this effect is minimal. Radial compression of the sleeve absorbs energy. In addition, the longitudinal compressing and tensioning of the sleeve absorbs substantial energy. While energy absorption produces heat, the heat is not confined locally, but is distributed. The amount of energy absorption is, of course, dependent upon the physical properties of the sleeve. Thus, by selecting the composition of the sleeve, a sleeve may be custom-made for the expected conditions of use.

The amount of energy absorption can also be controlled by increasing or decreasing the spacing between the indenting balls, as indicated by comparsion between FIGs. 9 and 10. Still further, the depth of penetration of the indenting may be varied. This is accomplished by adjustment of the cap 9 and the conical wall 11 which may be adjusted for minimum penetration, as indicated in FIG. 3, or a maximum penetration, as indicated in FIG. 4. By provision of a clearance groove 5, the device may be free of restraint when its retracted position, or any other selected position.

Reference is now directed to FIG. 12. The construction here illustrated is, in many respects, similar to the construction shown in FIGs. 1 through 10, and where applicable, similar reference characters are used. The construction shown in FIG. 12 includes a mandrel 1, having a fitting 2 at one end, and in this case, a flange 23 at its other end. The mandrel receives an energy absorbint sleeve 3, restrained against translating movement by the fitting 2 and flanged end 23, but capable of stretching or compressing, as in the first described embodiment. The sleeve and flanged end of the mandrel are received in a housing 24, closed at one end and provided with an end fitting 25.

The other, or open, end of the housing receives an adjustment collar 26 which is screwthreaded thereon and is provided with an internal shoulder 27. A retracting spring 28 is disposed between the flanged end 23 and the shoulder 27. The adjustment collar 26 extends forwardly from the shoulder 27 to form a detent engaging ring 29. Screwthreaded on the collar 26 is a cap 9, having a conical wall 11 and a retaining ring 14, to form a chamber as in the first described embodiment for indenting balls 13.

The construction shown in Fig. 12 operates in the manner of the first embodiment, except that the mandrel 1 and energy absorbing sleeve 3 are moved to their retracted position by the spring 28. Also, by reason of the screwthreaded connections between the housing 24, collar 26 and cap 9, the force of the spring may be adjusted and the depth of penetration of the indenting ball may also be adjusted.

Reference is directed to Fig. 13. The embodiment here illustrated is intended to indicate that the energy absorbing movement may be reversed from that shown in Figs. 1 through 10 and 12; that is, a cap 30 is provided, having conical walls 31 sloping in the opposite direction from the cap 9. The cap 30 may screwthread onto the housing, as in the previous embodiment; however, if adjustment is not needed, the housing 6 may be provided an external flange 32 and the cap secured thereto by a split retainer ring 33.

Reference is directed to Fig. 14, wherein this embodiment produces an energy absorbing reaction when subject to movement in either direction. In this case, the housing 6 is provided with a screwthreaded flange 34 which receives a cap 35 overlying the end thereof. Either one or both of the confronting walls of the flange and cap form conical portions 36. Adjustment of the cap determines the penetration of the indenting ball and hence the degree of energy absorption.

Reference is directed to FIG. 15. It is sometimes desirable that the amount of energy absorption vary with the relative position of the energy absorbing sleeve and the ball detents. This can be accomplished by providing a tapered mandrel 37 and a corresponding tapered energy absorbing sleeve 38. For simplicity of illustration in this case, the end of the housing 6 is shown as provided with an indenting ball race or channel 39.

Reference is directed to Fig. 16. In the previous embodiments the ball detents have surrounded the energy absorbing sleeve. In the embodiment shown in Fig. 16, the indenting balls are within the sleeve. More specifically, a mandrel 40 is provided with longitudinally extending grooves 41, the radially inner surfaces of which may taper to provide unidirectional operation of the indenting balls 13 and surrounding sleeve 42 which is pressed outwardly against a surrounding housing 43, which in this case, performs the same function as the mandrel 1 of the previously described embodiments.

Reference is now directed to Figs. 17, 18 and 19. In this construction, the energy absorbing function is produced by relative rotation of the sleeve and indenting balls. More specifically, a mandrel 44 is provided with a set of circumferentially extending grooves 45 which may have sloping radially inner walls and which receive indenting ball 13. The mandrel is surrounded by an energy absorbing sleeve 46 and a housing 47. The ends of the sleeve 46 and the housing 47 may be provided with interlocking ribs and slots 48 so that the sleeve will rotate with the housing. Relative rotation of the mandrel 44 and the sleeve 46 in one direction causes the indenting ball to engage the energy absorbing sleeve 46 in essentially the same manner as described previously.

Figure 21:
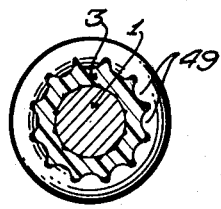
FIG. 21 is a transverse sectional view, taken through 21—21 of FIG. 20 with the indenting means in elevation.
Figure 22:
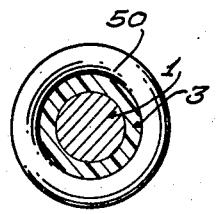
FIG. 22 is a similar transverse sectional view, showing a continuous indenting element or ring in place of a plurality of indenting elements.

Reference is now directed to Figs. 20, 21, and 22. The construction here illustrated includes a mandrel 1, sleeve 3, and housing 6. The housing 6 is provided at one end with a ring of integral indenting fingers 49 which press into the elastomeric sleeve in the manner of the indenting balls 13. Alternatively, an integral internal rib 50 may be employed as indicated in FIG. 22. The composition of the elastomeric sleeve may be selected so as to provide a surface having low frictional properties.

Figure 23:
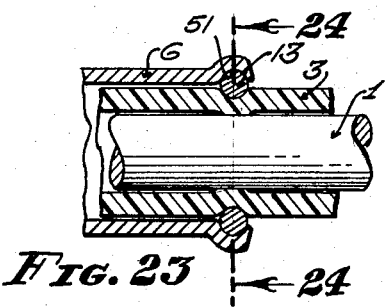
FIG. 23 is a fragmentary sectional view showing a further embodiment in which an indenting ring is substituted for the indenting balls.
Figure 24:
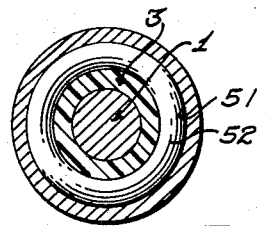
FIG. 24 is a transverse sectional view, taken through 24—24 of FIG. 23, showing the indenting ring in elevation.

Reference is directed to Figs. 23 and 24. The construction here illustrated also includes the mandrel 1, sleeve 3, and housing 6 at one end of which is provided an annular channel 51 which receives an annular indenting ring 52. In this case, also, the coefficient of friction of the sleeve 3 may be minimal. In addition, the indenting ring 52 may be formed of material which also has a low coefficient of friction. For example, a Teflon ring may be used or a molybdenum impregnated Teflon ring may be used.

Figure 25:
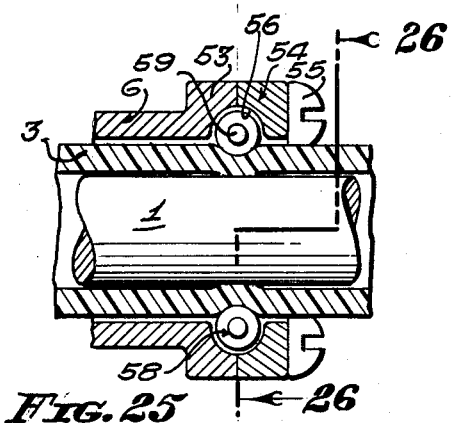
FIG. 25 is a fragmentary sectional view showing a still further embodiment in which indenting rollers are used in place of indenting balls.
Figure 26:
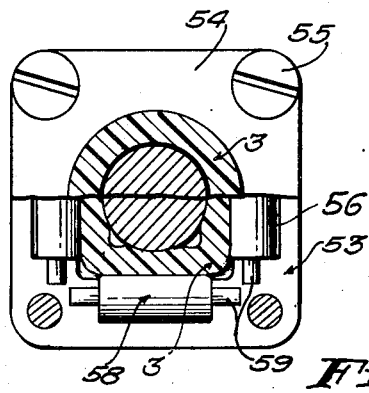
FIG. 26 is a transverse sectional view, taken through 26—26 of FIG. 25.

Reference is now directed to Figs. 25 and 26. This construction also may utilize the mandrel 1, sleeve 3, and housing 6, the housing being modified at one end to form a polygonal end 53, preferably square. In this case, the polygonal end 53 receives a cap 54 secured by screws 55. The polygonal end 53 and cap 54 form a set of roller cavities 56 and bearing cavities 57. Fitted in the roller cavities 56 are indenting rollers 58, having pins 59 which extend into the bearing cavities 57. If a circular mandrel and sleeve are used, the rollers press the sleeve into an essentially square figure in the region of indentations as shown in Fig. 26. However, if greater indentation is desired, the mandrel and its sleeve may be square. The pins 59 reduce the rolling friction of the rollers 58.

Figure 27:
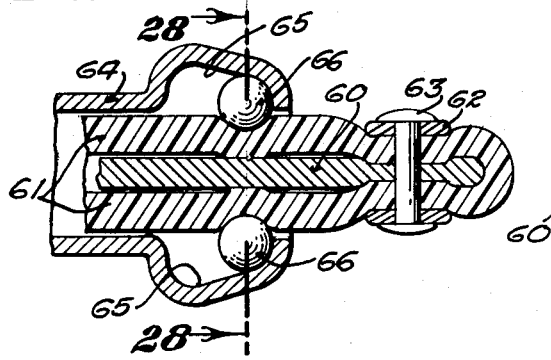
FIG. 27 is a fragmentary sectional view of a further modified construction also using rollers in which the rollers press against flat elastomeric members.
Figure 28:
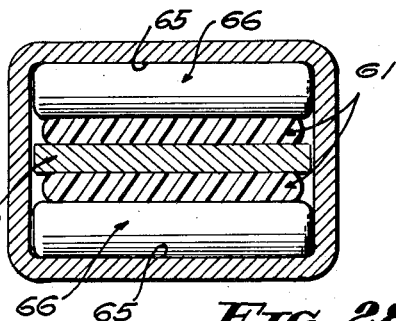
FIG. 28 is a transverse sectional view, taken through 28—28 of FIG. 27.

Reference is now directed to Figs. 27 and 28. In this construction, a mandrel bar 60 is substituted for the mandrel 1 and a pair of elastomeric straps 61 is substituted for the sleeve 3. The straps may be two portions of a single strap folded over an end of the mandrel bar 60 and secured by clamp strips 62 and rivets 63. A housing 64 surrounds the mandrel bar and the straps and is provided with opposed roller cavities 65 which in this case are shown as provided with tapered walls. A pair of indenting rollers 66 are received in the cavities 65.

In each of the constructions illustrated, the relationship of the indenting means, whether the means be indenting balls, indenting rollers, or indenting rings or fingers; and the elastomeric member, whether it be a sleeve or a strap, is the same. That is, the relationship shown in Fig. 11 applies to all of the constructions.

With further reference to Fig. 11, the distributed energy absorption regions 21 and 22 tend to be effective to counteract the effect of sudden, transient loads. That is, if a transient load occurs, there is a tendency for these regions to build up an opposing force which dissipates as the transient load itself dissipates. Thus, the relative movement tends to be of a uniform velocity even though the loads imposed are not uniform. If expected conditions of operation may involve transient loads, it may be desirable to limit the movement of the indenting elements to, say, the central third of the sleeve.

It should be noted that in each of the embodiments illustrated, the energy absorbing sleeve is not bonded to an underlying or overlying surface, but is held against translational displacement by being clamped at one end as in Fig. 3, or end restrained as in Fig. 12, or interlocked at both ends as in Fig. 17. As a consequence, the stresses created in the sleeve are distributed rather than localized.

While particular embodiments of this invention have been shown and described, it is not intended to limit the same to the details of the constructions set forth, but instead, the invention embraces such changes, modifications, and equivalents of the various parts and their relationships as come within the purview of the appended claims.

I claim:
1. An energy absorbing device, comprising:
   a. an energy absorbing elastomeric member having a surface;
   b. a carrier member confronting said surface of the elastomeric member, the members being capable or relative movement in a direction along said surface;
   c. indenting means carried by the carrier member for movement therewith relative to the elastomeric member, the indenting means pressing into the elastomeric member;
   d. and at least one restraining means for a portion of the elastomeric member spaced beyond the range of movement of the indenting means with respect to the elastomeric member and preventing movement of said restrained portion of said elastomeric member in said direction;
   e. the portion of the elastomeric member between the indenting means and the restraining means including an unrestrained portion free to move in said direction and deformable to effect distributed energy absorption upon movement of the indenting means relative to the elastomeric member in said direction, whereby the elastomeric member not only absorbs energy in the region of indentation by the indenting means, but also absorbs energy throughout the region between the indenting means and the restraining means.

2. An energy absorbing device as defined in claim 1, wherein:
   a. the energy absorbing member and carrier member are cylindrical; and,
   b. the indenting means is a circumferentially distributed set of indenting elements.

3. An energy absorbing device as defined in claim 1, wherein:
   a. the energy absorbing member and carrier members are cylindrical; and,
   b. the indenting means is circular.

4. An energy absorbing device as defined in claim 1, wherein:
   a. the indenting means is a set of rollers disposed in angular relation.

5. An energy absorbing device as defined in claim 1, wherein:
   a. the energy absorbing member and carrier member are flat; and
   b. the indenting means is a roller.

6. An energy absorbing device as defined in claim 1, wherein:
   A. the elastomeric member has a second surface opposite from the carrier member;
   b. a supporting member confronts the second surface of the elastomeric member;
   c. said restraining means is carried by the supporting member;
   d. and said indenting means presses the elastomeric member into frictional contact with the supporting member.

7. An energy absorbing device as defined in claim 1, wherein:
   a. the carrier member and indenting means move longitudinally as a unit relative to the energy absorbing member.

8. An energy absorbing device as defined in claim 1, wherein:
   a. the carrier member and its indenting means move rotationally as a unit relative to the energy absorbing member.

9. An energy absorbing device as defined in claim 1, wherein:
   a. the energy absorbing member includes a region clearing the indenting means, whereby within said region, the indenting means is freely movable relative to the energy absorbing member.

10. An energy absorbing device as defined in claim 1, wherein:
    a. the indenting means is a set spherical indenting elements;
    b. and the carrier member has a wall backing the indenting elements disposed in sloping relation to the energy absorbing member, whereby the indenting elements are operative when the indenting elements and energy absorbing member move relatively in one direction and are inoperative when the indenting elements and energy absorbing member move relatively in the opposite direction.

11. An energy absorbing device as defined in claim 1, wherein:
    a. the spacing of the energy absorbing member varies with respect to the indenting means thereby to effect a corresponding variation in the amount of energy absorbed during relative movement.

12. An energy absorbing device as defined in claim 1, wherein:
    a. the energy absorbing member also has a second surface, opposite from the carrier member;
    b. a supporting member confronts the second surface;
    c. the energy absorbing member and its supporting member as one unit and the carrier member and its indenting means as a second unnit are arranged to move longitudinally with respect to each other.

13. An energy absorbing device as defined in claim 1, wherein:
    a. the energy absorbing member also has a second surface, opposite from the carrier member;
    b. a supporting member confronts the second surface;

c. the elastomeric member and its supporting member as one unit and the carrier and its indenting means as a second unit are arranged to rotate with respect to each other.

14. An energy absorbing device as defined in claim 1, wherein:
   a. the elastomeric member and its supporting member are tapered with respect to the carrier and its indenting means and move longitudinally relative thereto to change the extent of indentation thereby to change the energy absorbed by the elastomeric member in the course of relative movement.

15. An energy absorbing device as defined in claim 1, wherein:
   a. the carrier member includes a tapered recess for the indenting means whereby, on movement relative to the elastomeric member in one direction, the indenting means is operative; whereas, on movement relative to the elastomeric member in the opposite direction, the indenting means is inoperative.

16. An energy absorbing means as defined in claim 1, wherein:
   a. a first and second restraining means are disposed at opposite sides of the indenting means in spaced relation thereto, thereby forming two portions of the elastomeric member subjected to distributed energy absorbing deformation.

17. An energy absorbing device, comprising:
   a. an energy absorbing elastomeric tubular member;
   b. a supporting member having at least a portion thereof slidably extending within said elastomeric tubular member;
   c. means restraining at least one end of said elastomeric tubular member relative to said supporting member;
   d. a carrier member having indenting means pressing into the outer surface of the elastomeric tubular member to deform it into pressure contact with said supporting member; whereby, upon relative axial movement of said supporting member and said indenting means, the elastomeric tubular member absorbs energy in the localized regions of pressure by the indenting means and is also deformed in the region between the indenting means and the restraining means to absorb energy.

18. An energy absorbing device as defined in claim 27, wherein:
   a. the other end of said elastomeric tubular member abuts a shoulder on said supporting member, whereby upon relative axial movement of said supporting member and said indenting means the elastomeric tubular member absorbs energy in the localized regions of pressure by the indenting means and also absorbs energy in the distributed regions at opposite sides thereof between the restraining means and the shoulder.

19. An energy absorbing device as defined in claim 17, wherein:
   a. the relative movement of the indenting means and its carrier member with respect to the elastomeric tubular member is longitudinal.

20. An energy absorbing device as defined in claim 17, wherein:
   a. the relative movement of the indenting means and its carrier member with respect to the elastomeric tubular member is rotational.

21. An energy absorbing device as defined in claim 17, wherein:
   a. the carrier member includes a retaining means for the indenting means, the retaining means having a wall tapering with respect to the elastomeric tubular member whereby relative movement in one direction renders the indenting means operative and in the opposite direction inoperative.

22. An energy absorbing device as defined in claim 17, wherein:
   a. the carrier member includes a retaining means for the indenting means, the retaining means being adjustable with respect to the carrier member to change the extent of indentation of the indenting means into the elastomeric tubular member, thereby to change the energy absorption of the elastomeric tubular member.

23. An energy absorbing device as defined in claim 17, wherein:
   a. the restraining means secures an end of the elastomeric member relative to the supporting member against movement in either direction, whereby the region of the elastomeric member between the restraining means and indenting means may be subject to compression or tension.

24. An energy absorbing device, comprising:
   a. a mandrel rod;
   b. a first attachment fitting at one end of the mandrel rod;
   c. an energy absorbing elastomeric sleeve slidably received on the mandrel rod;
   d. means at opposite ends of the sleeve for restraining the ends of the sleeve against movement relative to the mandrel, the sleeve being axially movable on the mandrel between its ends;
   e. a tubular housing slidably received over the sleeve and including an end having an internal groove movable relative to the sleeve between points adjacent the ends of the sleeve;
   f. a ring of balls received in the groove and dimensioned to indent the sleeve and press the sleeve locally against the mandrel;
   g. a second attachment fitting carried by the housing for cooperation with the first attachment fitting to effect relative movement of the indenting balls and sleeve;
   h. the indenting balls upon such relative movement causing local absorption of energy by the elastomeric sleeve; the remaining portions of the sleeve between the indenting balls and the restraining means at the ends of the sleeve causing at least energy absorbing compression of the sleeve throughout a region between the indenting balls and one of the restraining means.

25. An energy absorbing device as defined in claim 24, wherein:
   a. one of the retaining means secures the sleeve against tension loads whereby the portion of the sleeve between the indenting balls and said retaining means is subject to energy absorbing tension.

26. An energy absorbing device, as defined in claim 24, wherein:

a. the elastomeric sleeve differs in diameter at various portions thereof to alter the energy absorption thereof in accordance with a predetermined pattern during relative movement of the balls and sleeve.

27. An energy absorbing device, as defined in claim 24, wherein:
a. the groove is provided with a conical slope causing the balls to recede radially when moving in one direction with respect to the sleeve to reduce energy absorption and to advance radially when moving in the opposite direction with respect to the sleeve to increase energy absorption.

28. An energy absorbing device, as defined in claim 24, wherein:
a. the housing includes portions defining the groove which are adjustable axially to change the width of the groove, and the groove includes a conical wall whereby the depth of penetration of the balls and hence the energy absorption of the elastomeric sleeve is adjustable.

29. An energy absorbing device, comprising:
a. an elongated mandrel having a first attachment fitting at one end thereof;
b. an energy absorbing member secured to and covering the mandrel;
c. a tubular housing slidably received over the energy absorbing member and having a second attachment fitting;
d. a cap screwthreaded to an end of the housing, the cap and housing defining an annular groove confronting the energy absorbing member;
e. and a ring of balls disposed in the groove and indenting the energy absorbing member thereby to cause local absorption of energy by the energy absorbing member upon movement of the balls along the energy absorbing member; the balls being movable radially, upon adjustment of the cap relative to the housing member, thereby to change the amount of energy absorption.

30. An energy absorbing device, comprising:
a. supporting member;
b. an energy absorbing elastomeric member confronting the supporting member;
c. a carrier member having retainer means confronting the opposite side of the elastomeric member from the supporting member;
d. and a set of indenting means received in the retainer means and adapted to press into the elastomeric member to effect energy absorbing compression of the sleeve upon movement of the carrier and indenting means with respect to the elastomeric sleeve;
e. said retainer means being adjustable with respect to the carrier member to change the extent of indentation of the indenting means into the elastomeric member, thereby to change energy absorption of the elastomeric member.

31. An energy absorbing device, comprising:
a. supporting member;
b. an energy absorbing longitudinally extending elastomeric member confronting the supporting member;
c. a carrier member movable longitudinally relative to the elastomeric member having retainer means confronting the opposite side of the elastomeric member from the supporting member;
d. and a set of indenting means received in the retainer means and adapted to press into the elastomeric member to effect energy absorbing compression of the sleeve upon movement of the carrier and indenting means with respect to the elastomeric sleeve;
e. the retainer means having a wall tapering with respect to the elastomeric member to permit movement of the indenting means between an operative position and an inoperative position, thereby to permit free relative movement in one relative direction and energy absorbing movement in the opposite direction;
f. and a spring for exerting a force in a direction to cause the energy absorbing movement.

32. An energy absorbing device, comprising:
a. a supporting member;
b. an energy absorbing elastomeric member retained by the supporting member against translational movement but otherwise capable of sliding movement thereon within its elastic limits to effect distributed stretch and compression;
c. a carrier member confronting the side of the elastomeric member opposite from the supporting member;
d. indenting means carried by the carrier member and locally compressing the elastomeric member against the supporting member;
e. the elastomeric member, upon movement thereof relative to the carrier member and its indenting means, adapted to undergo localized energy absorption in the region of the indenting means as well as distributed energy absorption at either side thereof by reason of movement relative to the supporting member and resulting stretch and compression of portions of the elastomeric member;
f. the carrier member including means for adjusting the indenting means to and from the elastomeric member to change the energy absorbing effect thereof.

* * * * *